United States Patent
Wuthrich et al.

(10) Patent No.: US 10,165,739 B1
(45) Date of Patent: Jan. 1, 2019

(54) APPARATUS AND METHOD FOR CUTTING A ROOT BALL

(71) Applicant: 356864 Alberta Ltd., Airdrie (CA)

(72) Inventors: Timothy Wuthrich, Cochrane (CA); Leslie Poffenroth, Airdrie (CA)

(73) Assignee: 356864 Alberta LTD., Airdrie, Alberta (CA)

( * ) Notice: Subject to any disclaimer, the term of this patent is extended or adjusted under 35 U.S.C. 154(b) by 0 days.

(21) Appl. No.: 15/673,743

(22) Filed: Aug. 10, 2017

(51) Int. Cl.
*A01G 23/00* (2006.01)
*A01G 23/04* (2006.01)

(52) U.S. Cl.
CPC .................. *A01G 23/043* (2013.01)

(58) Field of Classification Search
CPC ...... A01B 13/00; A01G 23/043; A01G 23/04; A01G 23/046; A01G 23/06
USPC .................. 37/301, 302; 111/101; 144/24.12
See application file for complete search history.

(56) References Cited

U.S. PATENT DOCUMENTS

| | | | | |
|---|---|---|---|---|
| 3,558,177 A * | 1/1971 | Snead | ................. | A01G 23/046 111/101 |
| 4,271,611 A * | 6/1981 | Paul | ................. | A01G 23/043 111/101 |
| 4,341,025 A * | 7/1982 | Stocker | ................. | A01G 23/046 111/101 |
| 4,403,427 A * | 9/1983 | Dahlquist | ................. | A01G 23/046 111/101 |
| 4,658,518 A * | 4/1987 | Korenek | ................. | A01G 23/046 111/101 |
| 5,600,904 A * | 2/1997 | Bowling | ................. | A01B 13/00 111/101 |
| 5,713,419 A * | 2/1998 | Kaczmarski | ................. | E02F 3/96 111/101 |
| 6,530,333 B1 * | 3/2003 | Cox | ................. | A01G 23/043 111/101 |
| 7,073,452 B1 * | 7/2006 | Manke | ................. | A01G 23/043 111/101 |
| 7,770,296 B2 * | 8/2010 | Brauch | ................. | A01G 23/043 111/101 |
| 9,288,949 B1 * | 3/2016 | Basinger | ................. | A01G 23/06 |

* cited by examiner

*Primary Examiner* — Robert E Pezzuto
(74) *Attorney, Agent, or Firm* — Gowling WLG (Canada) LLP

(57) ABSTRACT

Embodiments relate to a tool for digging root balls of trees. The digging tool uses at least two cutting members that move in different paths for digging through the soil and cutting through a portion of the tree's roots. One cutting member moves along a substantially linear-path thereby forming a portion of a side wall of the root ball. The other cutting member moves along an arcuate path for forming a lower wall of the root ball. When the root ball is formed, the tool can be used to remove the root ball and the tree from a first location and move the tree to a second location. The size of the cutting members can be selected to form a root ball of a desired shape and size to allow the tree to continue growing at the second location.

13 Claims, 6 Drawing Sheets

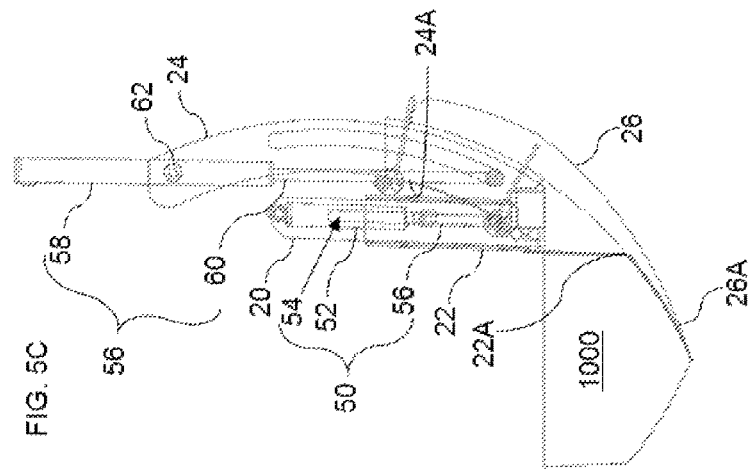
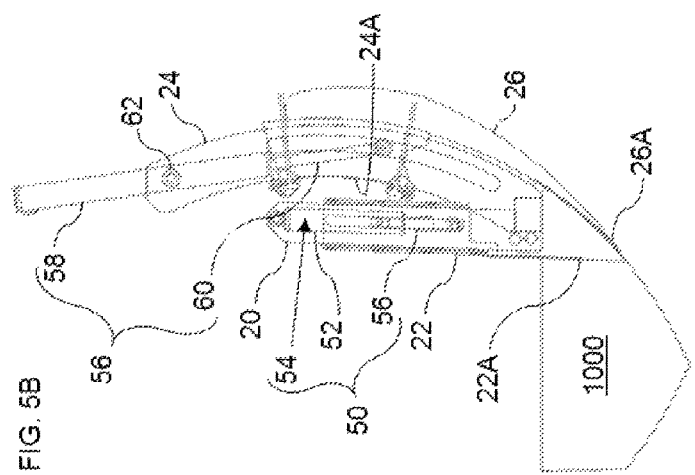
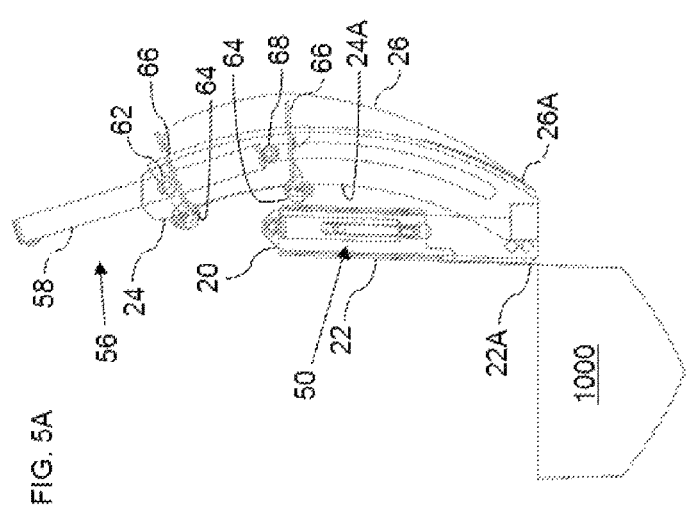

APPARATUS AND METHOD FOR CUTTING A ROOT BALL

TECHNICAL FIELD

This disclosure generally relates to transplanting trees and other large woody plants. In particular, the present disclosure relates to an apparatus and method for cutting a root bulb with a sufficient size and appropriate shape for transplanting the root bulb.

BACKGROUND

To transplant a tree from a first location to a second location requires extracting a root ball that allows the tree to survive in the second location. The root ball must be of sufficient size and/or proper shape to ensure that the tree is physically anchored at the second location. The root ball must also be a sufficient size to ensure adequate uptake of nutrients, chemicals and water from the soil at the second location.

The size and shape requirements of the root ball that provide the best chance of a transplanted tree's survival vary based upon the species and size of the tree that is being transplanted.

Mechanizing a process of digging root balls of a desired size and shape faces challenges. For example, trees are often transplanted from tree nurseries in close quarters in order to maximize space on the nursery's land. Close quarters may restrict the size of machines that can access the trees that are to be transplanted. Furthermore, the tree canopy can impose a height restriction on the machinery, which can limit the downforce that the machinery can generate while digging. This downforce limitation may hinder the ability of machines to make a clean cut of the roots while forming a root ball.

SUMMARY

Embodiments of the present disclosure relate to an apparatus and method for producing a root ball of a desired shape and size. The apparatus may be referred to as a digging tool that comprises a frame that is operatively couplable to a support vehicle. The digging tool also comprises an arm that is connected to the frame and the arm includes a first tower for supporting a first cutting-member that can move between a retracted position and an extended position along a substantially linear-path. The arm also supports a second tower that supports a second cutting-member. The second cutting-member can move between a retracted position and an extended position along an arcuate path.

Without being bound by any particular theory, the two cutting elements can produce a root ball with a desired shape of various sizes.

BRIEF DESCRIPTION OF THE DRAWINGS

These and other features of the present disclosure will become more apparent in the following detailed description in which reference is made to the appended drawings.

FIG. 1 is a top plan-view of a digging tool according to one embodiment of the present disclosure, wherein

FIG. 2 is an isometric view of the digging tool shown in FIG. 1, wherein

FIG. 3 is a front elevation-view of the digging tool shown in FIG. 1, wherein

FIG. 4 is a side elevation-view of the digging tool shown in FIG. 1, wherein

FIG. 5 is a side elevation view of one arm of the digging tool shown in FIG. 1, the arm supports a first cutting-member and a second cutting-member both shown with a portion of the cutting members cut-away, wherein FIG. 5A shows the first cutting-member and the second cutting-member in a retracted position, FIG. 5B shows the first cutting-member and the second cutting-member in a partially extended position; and FIG. 5C shows the first cutting-member and the second cutting-member in a fully extended position.

DETAILED DESCRIPTION

Figure 1A:
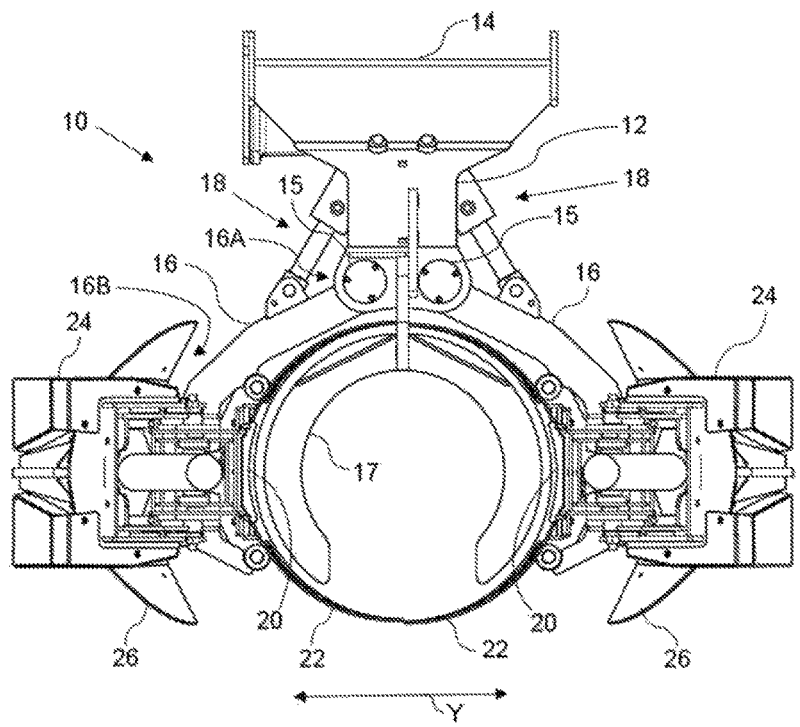
FIG. 1A shows the digging tool in a closed position and FIG. 1B shows the digging tool in an open position.

Embodiments of the present disclosure relate to a tool for digging root balls of trees, shrubs or other woody plants, collectively referred to herein as trees. The digging tool uses at least two cutting members that move in different paths and both for digging through the soil and cutting through a portion of the tree's roots. One cutting member moves along a substantially linear-path thereby forming a portion of a side wall of the root ball. The other cutting member moves along an arcuate path for forming a lower wall of the root ball. When the root ball is formed, the tool can be used to remove the root ball and the tree from a first location and move the tree to a second location. The size of the cutting members is selected to form a root ball of a desired shape and size to allow the tree to continue growing.

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

Embodiments of the present disclosure will now be described by reference to FIG. 1 to FIG. 6, which show representations of the digging tool according to the present disclosure.

FIG. 1, FIG. 2, FIG. 3 and FIG. 4 show a digging tool 10 according to one embodiment of the present disclosure. The digging tool comprises a frame 12 and two opposing arms 16, each of which may also be referred to as gates or supports. It will be appreciated by one skilled in the art that the digging tool 10 can include one or more arms 16. FIG. 1A further shows a double-sided arrow that represents the horizontal plane Y of the digging tool 10. FIG. 3A and FIG. 4A both show two double sided arrows that represent the horizontal plane Y and a vertical plane X of the digging tool 10.

The frame 12 may also include a hitch 14 that allows the frame 12 to be mechanically and/or operatively coupled to a vehicle (not shown). Some examples of a support vehicle include, but are not limited to: a skid-steer loader, a tractor, excavator, backhoe, truck, a wheeled loader or a tracked loader. The hitch 14 mechanically couples the digging tool 10 so that the vehicle can move the digging tool 10 to desired locations. The hitch 14 also operatively couples the digging tool 10 to the vehicle by providing or supporting power-supply connections and control connections. The power-supply connections can be hydraulic, pneumatic, mechanical, electrical-power cables or combinations thereof that connect the digging tool 10 to a power supply such as a hydraulic power-supply, a pneumatic power-supply, a mechanical power-supply, an electrical power-supply or combinations thereof. The control connections can operatively connect the digging tool 10 to a controller (not shown). The controller may be automated or user operated.

In some embodiments of the present disclosure, the controller can generate power to actuate the arms 12, or the position of the cutting members 22, 26 by using a hydraulic motor that is positioned in a hydraulic input-line that is in fluid communication between a source of hydraulic fluid and the digging tool 10. The controller can use electronics, such as solenoids or other types of electronics, to control the open/closed position of valves within a hydraulic manifold. Each output from the hydraulic manifold can control a different function of the digging tool 10 with a return line from any hydraulic actuators of the digging tool 10 back to the hydraulic manifold and then to a hydraulic tank-line. The controller can provide wireless control over the open/closed position of the valves of the hydraulic manifold and, therefore, over the different positions of rod 56 and the first cutting-member, both shown in FIG. 5. At least one type of suitable controller and hydraulic system is described in Canadian Patent No. 2,717,112.

Figure 1B:
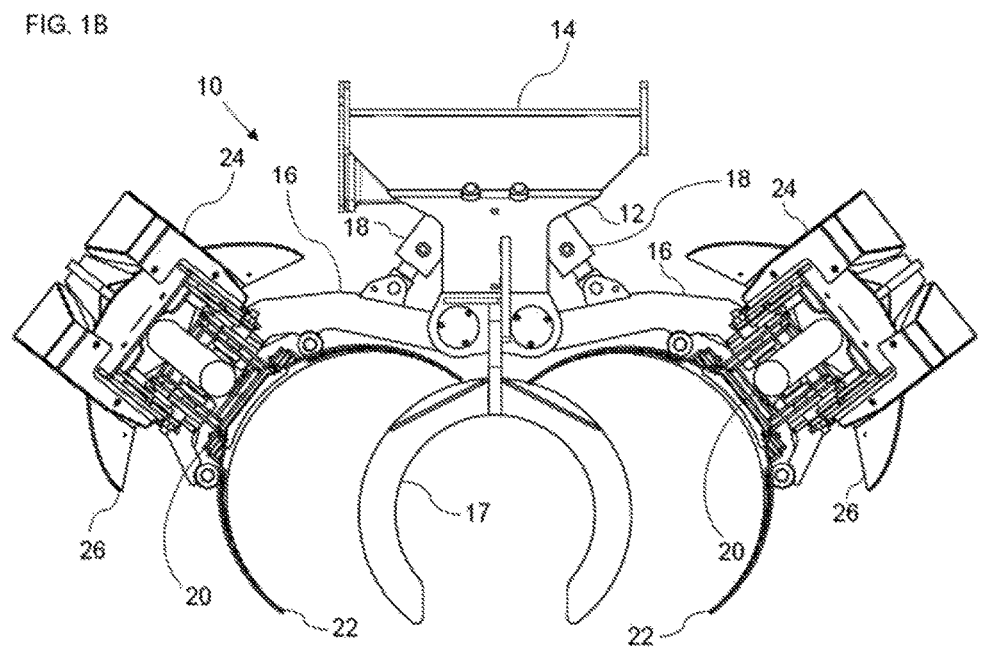
Figure 2A:
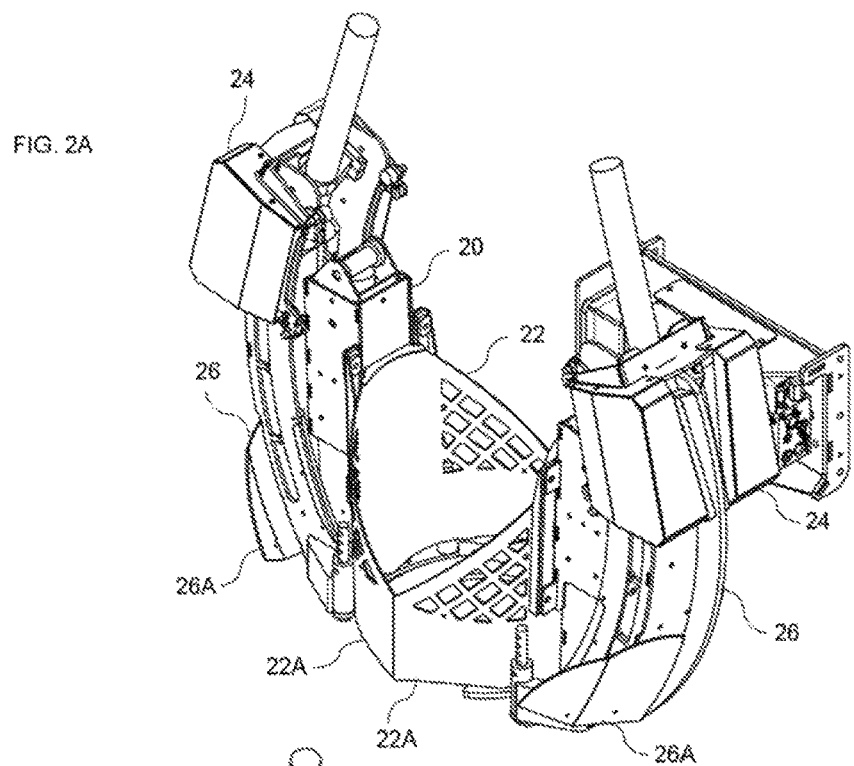
FIG. 2A shows the digging tool in the closed position and FIG. 2B shows the tool in the open position.
Figure 2B:
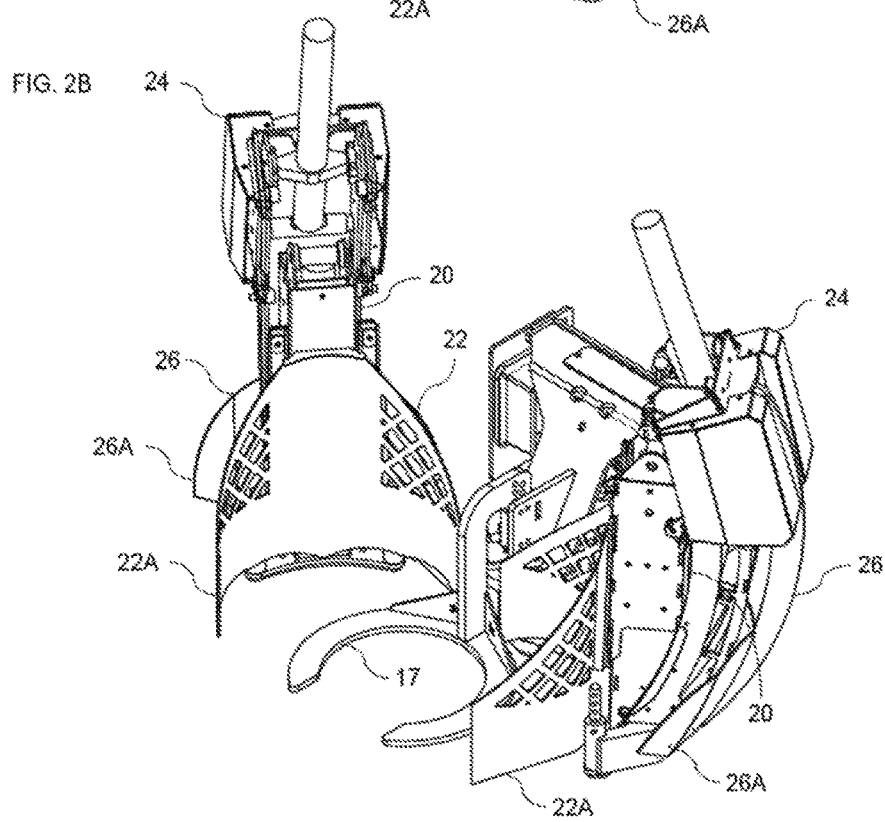

Each arm 16 has a first end 16A and a second end 16B. In some embodiments of the present disclosure, each arm 16 is pivotally connectable at the first end 16A to the frame 12 at a coupling point 15 so that each arm 16 can articulate about the coupling point 15. The coupling points 15 can be any type of connection that allows the arms 16 to move relative to the frame 12, such as but not limited to a hinge, a ball-and-socket joint and the like. Each arm 16 can be moved about each pivot point 15 by an actuator 18 to move along the horizontal plane Y to move the arms 16 between a closed position (FIG. 1A) and an open position (FIG. 1B). The actuator 18 may be a linear actuator such as a one-way hydraulic cylinder with a biasing-member return, a two-way hydraulic cylinder, a mechanical linear-actuator, a pneumatic linear-actuator, an electric linear-actuator or any other type of linear actuators, or other types of known actuators, that can controllably move each arm 16 relative to the frame 12. There may be one actuator 18 for all arms 16 of the digging tool 10 or each arm 16 may have its own actuator 18.

Figure 3A:
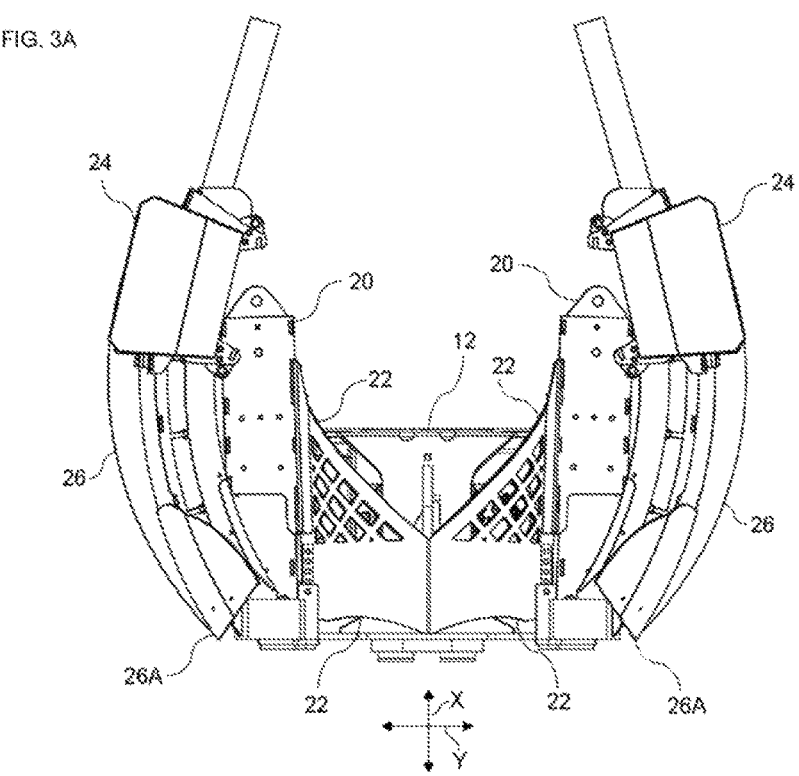
FIG. 3A shows the digging tool in the closed position and FIG. 3B shows the digging tool in the open position.
Figure 3B:
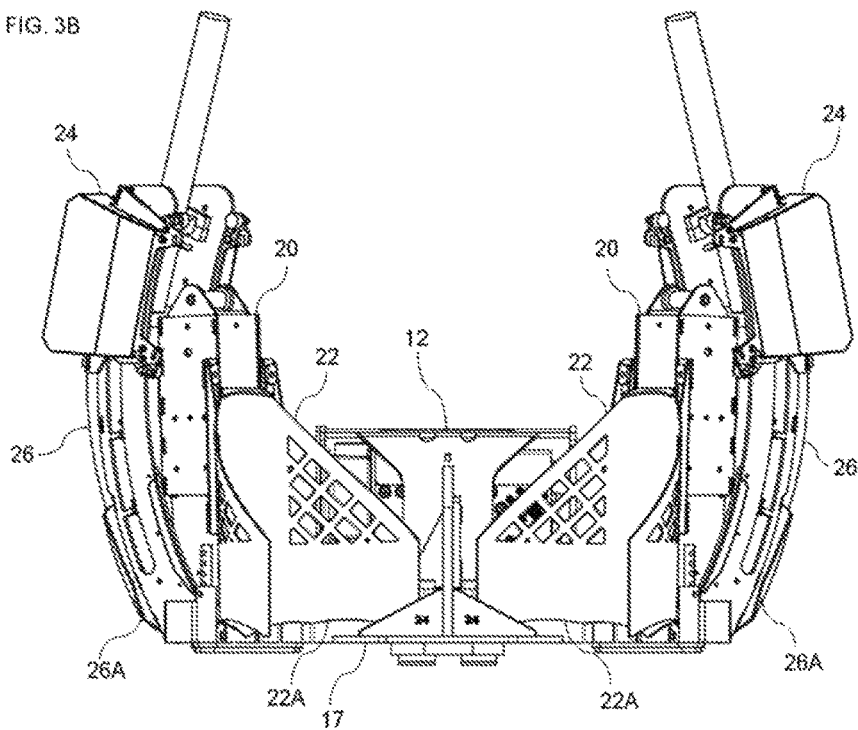
Figure 4A:
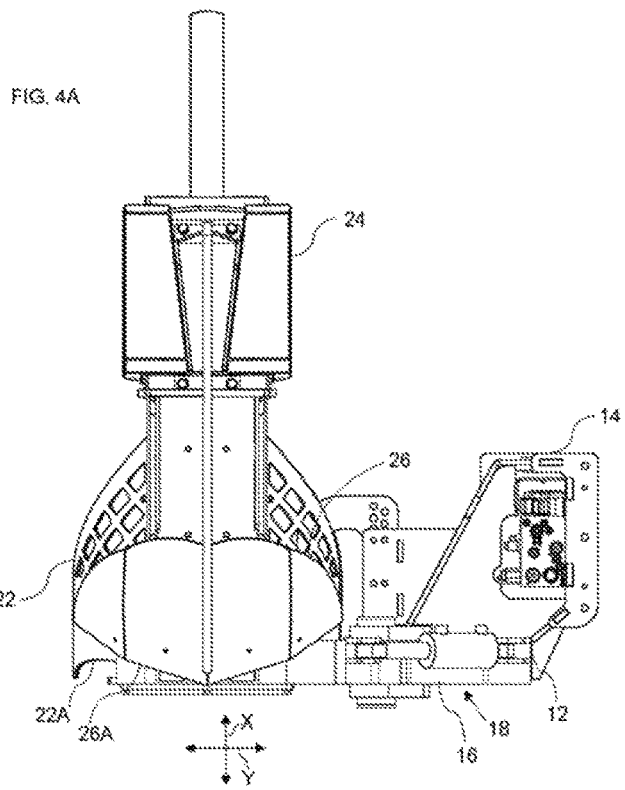
FIG. 4A shows the digging tool in the closed position and FIG. 4B shows the digging tool in the open position.
Figure 4B:
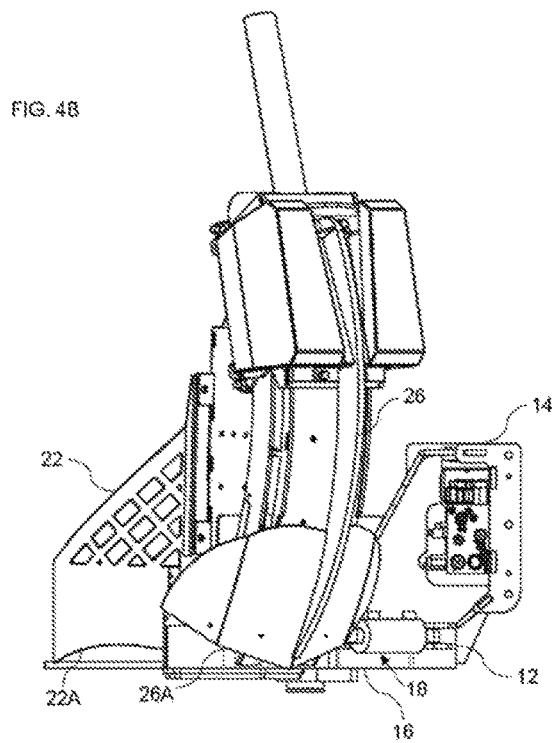

The arm 16 is connected to and supports a first tower 20 and a second tower 24. The first tower 20 can extend upwardly and away from the arm 16 substantially along the vertical plane X. The first tower 20 supports a first linear-actuator 50 (shown in FIG. 5) and a first cutting-member 22. The first linear-actuator 50 is operatively coupled to the power supply, the controller and the first cutting-member 22 so that the first linear-actuator 50 can actuate the first cutting-member 22 between a retracted position (FIG. 3A) and an extended position (FIG. 3B). FIG. 5 shows a non-limiting example of the first linear-actuator 50 as being a two-way hydraulic cylinder with a cylinder 52 that is housed inside of the first tower 20. The cylinder 52 defines an internal cylinder-chamber 54 that is in fluid communication with a source of hydraulic fluid and that houses a rod 56 that can move between a retracted position (FIG. 5A), an intermediate position (FIG. 5B) and an extended position (FIG. 5C) under hydraulic power that is controlled by the controller. The rod 56 is operatively coupled to the first cutting-member 22 so that the movement of the first rod 56 between the positions shown in FIG. 5 causes the first cutting-member 22 to move as well so that as the rod 56 moves between the positions shown in FIG. 5, so does the first cutting-member 22, also as shown in FIG. 5.

The first cutting-member 22 defines a leading edge 22A on a lower most surface. The first cutting-member 22 has a semi-circular shape when viewed from a top plan-view (FIG. 1). In the embodiments of the present disclosure where there is more than one arm 16, each of the first cutting-members 22 contribute a substantially equal portion to form a full circle (when viewed from the top plan-view). For example, if there are two arms 16, then each of the first cutting-members 22 has a semi-circular shape that contributes about half a turn of a complete circle (about 180 degrees, which is also referred to as 7C radians) when the digging tool 10 is in the closed position (compare FIG. 1A and FIG. 1B). As a further example, if there are three arms 16, then each of the first cutting-members 22 has a semi-circular shape that contributes about one third of a turn of a complete circle (about 120 degrees, which is also referred to as $2\pi/3$ radians) when the digging tool 10 is in the closed position.

Figure 6:
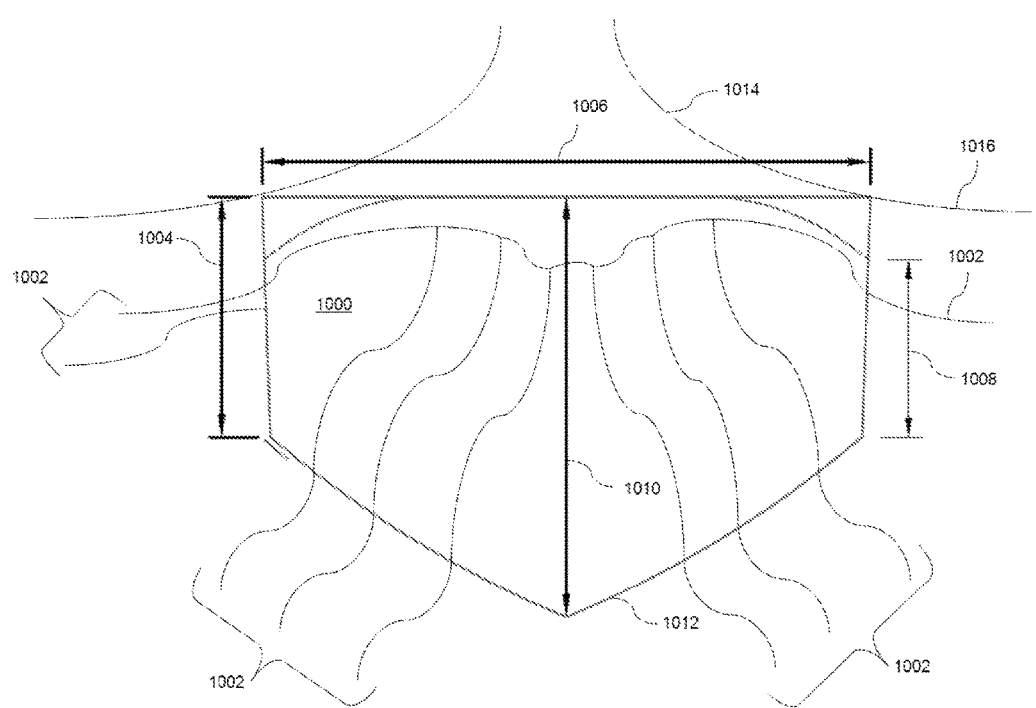
FIG. 6 is a schematic, side elevation-view of a root ball that can be formed by embodiments of the present disclosure.

In some embodiments of the present disclosure, the first cutting-member 22 moves between the retracted position and the extended position in a substantially linear-path. The substantially linear-path can be substantially parallel to the vertical plane X of the digging tool 10, or not. As the first cutting-member 22 moves from the retracted position to the extended position, the leading edge 22A will dig through the material surrounding the roots 1002 of the tree 1014 and cut through a portion of the roots 1002 of the tree 1014 to form side walls of a root ball 1000 (FIG. 6).

In some embodiments of the present disclosure, the second tower 24 curves along the horizontal plane Y as it extends away from the arm 16 in the vertical plane X. The second tower 24 supports a second linear-actuator 56 and the second cutting-member 26. The second linear-actuator 56 is operatively coupled to the power supply, the controller and the second cutting-member 26 so that the second linear-actuator 56 can actuate the second cutting-member 26 between a retracted position (FIG. 3A) and an extended position (FIG. 3B). FIG. 5 shows a non-limiting example of the second linear-actuator 56 as being pivotally connected to the second tower 24 by a pivot pin 62. The second linear-actuator 56 may comprise a second cylinder 56 that defines a second internal cylinder-chamber (not shown) that is in fluid communication with source of hydraulic fluid and that houses a second rod 60 (FIG. 5B and FIG. 5C). The second rod 60 can move between a retracted position (FIG. 5A), an intermediate position (FIG. 5B) and an extended position (FIG. 5C) under hydraulic power that is controlled by the controller. The second rod 60 is operatively coupled to the second cutting-member 26 so that the movement of the second rod 60 between the positions shown in FIG. 5 causes the second cutting-member 22 to move as well, also as shown in FIG. 5. The second rod 60 can be pivotally coupled to the second cutting-member 26 by a second pivot-pin 68.

The second tower 24 defines an arcuate path for the second cutting member 26 to follow as it is actuated between the retracted position and the extended position. In some embodiments of the present disclosure, the second tower 24 can define an edge 24A that guides the movement of the second cutting-member 26. In some embodiments of the present disclosure, the second cutting-member 26 can include one or more wheels 64, or other roller bearings, that contact and rotate upon the edge 24A as the second cutting-member 26 moves between the retracted position and the extended position. The one or more wheels 64 are coupled to the second-cutting member 26 by connection arms 66 (FIG. 5A). While FIG. 5 shows the edge 24A as being an internal edge, it is understood that the second cutting-member 26 can be configured so that any number of different edges of the second tower 24 can guide movement of the second cutting-member 26 along the arcuate path.

The second cutting-member 26 defines a leading edge 26A on a lower most surface. In some embodiments of the present disclosure the second cutting-member 26 can also have a curved shape when viewed from the top plan-view (FIG. 1). The shape of the second cutting-member 26 can be selected so that when the second cutting-member 26 is in the extended position it can define a curvi-linear, bowl shape. In the embodiments of the present disclosure where there is more than one arm 16, each of the second cutting-members 26 can substantially align in the extended position to form the bowl shape. For example, if there are two second cutting-members 26, then each can be selected to form about half of the bowl shape so that when the second cutting-members 26 are in the extended position, mutually opposed leading edges 26A can come into proximity of each other, and possibly into contact, to form the bowl shape. As a further example, if there are three second cutting-members 26, then each can be selected to form about a third of the bowl shape.

In some embodiments of the present disclosure the bowl shape formed by the second cutting-member 26 being in the extended position allows the digging tool 10 to support the root ball 1000 while pulling the tree 1014 out of the ground and while it is being prepared for transplant, for example if the root ball 1000 is supported in a basket, plastic pot, fiber pot, wooden box, bucket or other type of cover such as a burlap or stretch-wrap covering. In other embodiments of the present disclosure, the first cutting-member 22 can be used to support the root ball 1000 while pulling the tree 1014 out of the ground and while it is being prepared for transplant. In some embodiments of the present disclosure, both cutting members 22, 26 can support the tree 1014 during pulling of the tree 1014 and preparation for transplant.

The pivot pin 62 and the second pivot-pin 68 allow the second linear-actuator 56 to pivot relative to the second tower 24 so that as the second cutting-member 26 moves along the arcuate path the second linear-actuator 56 can maintain its linear alignment with the point where the rod 60 is pivotally coupled to the second cutting-member 26.

In some embodiments of the present disclosure, the digging tool 10 can include a guide 17 that is connected to the frame 12 which extends from the frame 12 to engage the trunk of the tree 1014 that is going to be transplanted. The guide 17 provides the user with a visual confirmation that the digging tool 10 is in a desired position relative to the tree 1014. The guide 17 can also be positioned about the trunk of the tree 1014 to support the tree 1014 during digging and transplant operations.

In some embodiments of the present disclosure, the first cutting-member 22 and the second-cutting member 26 can be selected to provide a root ball 1000 of a desired size (see FIG. 6). For example, the root ball 1000 may have a width 1006 of between about 10 inches (one inch equals about 2.54 centimeters) to about 28 inches when measured at ground level. The side walls 1008 can have a height of between about 2.5 inches and about 10 inches. The overall height 1010 of the root ball 1000 can be between about 10 inches and about 20 inches.

In use, the digging tool 10 can be used to form a root ball 1000 from a planted tree 1014 so that the tree 1014 can be transplanted to a second location. The first linear-actuator 50 can be activated to actuate the first cutting-member 22 to move downwardly along the substantially linear-path into the ground for establishing a side wall 1008 of the root ball 1000. The first cutting-member 22 can be driven with sufficient force so that the leading edge 22A digs through the soil and cuts through the roots 1002 of the tree 1014. The second linear-actuator 56 can be activated at the same time as the first linear-actuator 50, or not, to actuate the second cutting-member 24 to move downwardly along the arcuate path into the ground for establishing a lower wall 1012 of the root ball 1000.

When the side wall 1008 and the lower wall 1012 of the root ball 1000 are formed, the tree 1012 can be lifted up out of the ground, bringing the root ball 1000 and the tree 1012 with it. In some embodiments of the present disclosure, one or both of the cutting members 22, 26 can support the root ball 1000. Alternatively, both cutting members 22, 26 can be retracted and the root ball 1000 can be removed from the ground by hand.

We claim:

1. An apparatus for forming a root ball comprising:
   (a) a frame that is operatively couplable to a support vehicle;
   (b) at least one arm that is connected to the frame comprising:
      (i) a first tower that is supported by the at least one arm;
      (ii) a first cutting-member that is supported by the first tower and movable between a retracted position and an extended position along a substantially linear-path;
      (iii) a second tower that is supported by the at least one arm; and
      (iv) a second cutting-member that is supported by the second tower and moveable between a retracted position and an extended position along an arcuate path, wherein in operation the second cutting-member moves along the arcuate path to cut a lower wall of a root ball;
   wherein the first cutting-member and the second cutting-member are movable from their retracted to extended positions independently of each other.

2. The apparatus of claim 1, wherein the first tower supports a first linear-actuator that is operatively couplable to the first cutting-member for moving the first cutting-member between the retracted position and the extended position.

3. The apparatus of claim 1, wherein the second tower supports a second linear-actuator that is operatively couplable to the second cutting-member for moving the second cutting-member between the retracted position and the extended position.

4. The apparatus of claim 1, wherein the second tower is curved and guides the movement of the second cutting-member along the arcuate path.

5. The apparatus of claim 1, wherein the at least one arm is pivotally connected to the frame and wherein the digging tool further comprises an actuator for moving the at least one arm between an open position and a closed position.

6. The apparatus of claim 1, wherein the at least one arm is two opposing arms.

7. The apparatus of claim 1, further comprising a hitch for operatively connecting the digging tool to a vehicle.

8. The apparatus of claim 1, wherein the first cutting-member and the second cutting-member are selectable to form a tree root ball of a desired size.

9. The apparatus of claim 1, wherein the at least one arm extends from the frame along a substantially horizontal plane.

10. The apparatus of claim 9, wherein the first tower and the second tower extend along a substantially vertical plane to the at least one arm.

11. The apparatus of claim 1, wherein in the retracted position the second cutting-member is within or alongside the second tower.

12. The apparatus of claim 1, wherein in the extended position, the second cutting-member defines a curvilinear, bowl shape.

13. The apparatus of claim 1, wherein the at least one arm is at least two arms, and each of the first cutting-members has a semi-circular shape and together form a full circle in the extended position.

* * * * *